(12) United States Patent
Takasu et al.

(10) Patent No.: US 10,102,880 B2
(45) Date of Patent: Oct. 16, 2018

(54) INFORMATION PROCESSING DEVICE, SHOOTING APPARATUS AND INFORMATION PROCESSING METHOD

(71) Applicant: OLYMPUS CORPORATION, Hachioji-shi, Tokyo (JP)

(72) Inventors: Takao Takasu, Tokorozawa (JP); Kei Matsuoka, Hachioji (JP); Yukari Okamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 394 days.

(21) Appl. No.: 14/329,360

(22) Filed: Jul. 11, 2014

(65) Prior Publication Data

US 2015/0043884 A1 Feb. 12, 2015

(30) Foreign Application Priority Data

Aug. 12, 2013 (JP) ................................ 2013-167607

(51) Int. Cl.

| G11B 27/22 | (2006.01) |
|---|---|
| H04N 5/77 | (2006.01) |
| G06F 17/30 | (2006.01) |
| H04N 5/232 | (2006.01) |

(52) U.S. Cl.
CPC ........ *G11B 27/22* (2013.01); *G06F 17/30778* (2013.01); *G06F 17/30858* (2013.01); *H04N 5/772* (2013.01); *H04N 5/23229* (2013.01)

(58) Field of Classification Search
CPC ............... G11B 27/22; G06F 17/30778; G06F 17/30858; H04N 5/772; H04N 5/23229
See application file for complete search history.

(56) References Cited

U.S. PATENT DOCUMENTS

| 2002/0116195 A1* | 8/2002 | Pitman ................... G06Q 30/06 |
| | | 704/260 |
| 2003/0053680 A1* | 3/2003 | Lin ......................... H04S 5/005 |
| | | 382/154 |
| 2003/0154084 A1* | 8/2003 | Li ....................... G06K 9/00228 |
| | | 704/273 |
| 2004/0024755 A1* | 2/2004 | Rickard ............ G06F 17/30864 |

(Continued)

FOREIGN PATENT DOCUMENTS

JP 2006-109322 4/2006

*Primary Examiner* — Hung Dang
*Assistant Examiner* — Sunghyoun Park
(74) *Attorney, Agent, or Firm* — Volpe and Koenig, P.C.

(57) ABSTRACT

An information processing device is provided with: an image meaning judgment section classifying and judging an inputted image as having a particular meaning by classifying characteristics of the image itself and referring to a database; an audio meaning judgment section classifying and judging an inputted audio as having a particular meaning by classifying characteristics of the audio itself and referring to a database; and an association control section outputting the inputted image and the inputted audio acquired at different timings mutually in association with each other on the basis of each of judgment results of the image meaning judgment section and the audio meaning judgment section; and the information processing device is capable of, even if an image without a corresponding audio or an audio without a corresponding image is inputted, outputting the image and the audio in association with each other.

12 Claims, 16 Drawing Sheets

(56) References Cited

U.S. PATENT DOCUMENTS

| | | | |
|---|---|---|---|
| 2004/0037540 A1* | 2/2004 | Frohlich | G11B 31/006 386/285 |
| 2005/0207622 A1* | 9/2005 | Haupt | G06K 9/00288 382/118 |
| 2005/0234901 A1* | 10/2005 | Caruso | G06F 17/3002 |
| 2007/0027861 A1* | 2/2007 | Huentelman | G06F 17/30707 |
| 2007/0162924 A1* | 7/2007 | Radhakrishnan | G06K 9/00718 725/18 |
| 2008/0307337 A1* | 12/2008 | Marinkovich | G06F 17/30274 715/764 |
| 2009/0089056 A1* | 4/2009 | Fujii | G06F 17/30746 704/246 |
| 2009/0147624 A1* | 6/2009 | Hara | H04N 5/232 367/131 |
| 2011/0039598 A1* | 2/2011 | Tang | H04N 5/772 455/556.1 |
| 2011/0061068 A1* | 3/2011 | Ali | G06Q 30/0241 725/9 |
| 2011/0261257 A1* | 10/2011 | Terry | G06K 9/00221 348/515 |
| 2012/0016677 A1* | 1/2012 | Xu | G10L 25/78 704/270 |
| 2013/0085825 A1* | 4/2013 | Davis | G06Q 50/184 705/14.7 |

* cited by examiner

FIG. 3

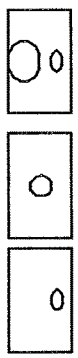

| MEANING | IMAGE | AUDIO |
|---|---|---|
| BUBBLES (A) | WHITE BLOBS GO UP FROM VICINITY OF PERSON'S FACE AGAINST GRAVITY | SOUND OF SMALL BUBBLES RISING / SOUND OF LARGE BUBBLES RISING / REPEATED LOW-FREQUENCY SOUND (CONTINUES FOR ABOUT 3 SECONDS) |
| BREATHING (B) | IMAGE BEFORE EMERGENCE OF WHITE BLOBS BEFORE WHITE BLOBS GO UP FROM VICINITY OF PERSON'S FACE AGAINST GRAVITY | UNDERWATER BREATHING SOUND (HISS) / HEAVY WHISTLING SOUND / CONTINUOUS SOUND FOR ABOUT 2 SECONDS PRECEDING REPEATED LOW-FREQUENCY SOUND |
| FISH MOVING ABOVE GRAVEL/SAND (C) | IMAGE OF FISH MOVING IN DIRECTION OF ITS FACE / CHANGE OF WHITE GRANULATED SUBSTANCE FROM LOWER PART OF SCREEN TOWARD DIRECTION OPPOSITE TO MOVING DIRECTION OF FACE | GRAVEL CRUNCHING SOUND / SAND STIRRING SOUND / HIGH-FREQUENCY; DISAPPEARS IN ABOUT 0.5 SECONDS |

FIG. 9

| AUDIO JUDGMENT | PATTERN A | 30 TO 33 SECONDS | 37 TO 40 SECONDS | |
| --- | --- | --- | --- | --- |
| | PATTERN B | 28 TO 30 SECONDS | 34 TO 36 SECONDS | 41 TO 43 SECONDS |
| | PATTERN C | 61 TO 62 SECONDS | | |
| IMAGE JUDGMENT | PATTERN A | 35 TO 38 SECONDS | 42 TO 45 SECONDS | |
| | PATTERN B | (32 TO 34 SECONDS) | (39 TO 41 SECONDS) | |
| | PATTERN C | 61 TO 62 SECONDS | | |

FIG. 11

| JUDGMENT RESULT | IMAGE | AUDIO |
|---|---|---|
| RIVER (D) | MOVE IN SAME DIRECTION<br>DETECT GLITTERING | BROOK RIPPLING SOUND<br>RIVER RUSHING SOUND<br>REPEATED LOW-FREQUENCY SOUND (ABOUT 1-SECOND CYCLE) |
| WAVES (E) | MOVE AND RETURN IN SAME DIRECTION<br>DETECT WHITECAPS | WAVES SURGING SOUND<br>WAVES SPLASHING SOUND<br>REPEATED LOW-FREQUENCY SOUND (ABOUT 4-SECOND CYCLE) |
| BIRD (F) | DETECT BIRD'S FACE<br>SHAPE OF FLYING | SMALL BIRD'S TWEET<br>LARGE BIRD'S SQUAWK<br>PARTICULAR FREQUENCY BAND |

FIG. 13

| | | |
|---|---|---|
| AUDIO JUDGMENT | PATTERN D (FAVORABLE) | 3 TO 6 SECONDS |
| | PATTERN D (SMALL) | 10 TO 15 SECONDS |
| | PATTERN D (NOISE INCLUDED) | 0 TO 3 SECONDS |
| | PATTERN E | |
| | PATTERN F | |
| IMAGE JUDGMENT | PATTERN D | 0 TO 15 SECONDS (10 TO 15 SECONDS FOR SHOOTING) |
| | PATTERN E | |
| | PATTERN F | |

INFORMATION PROCESSING DEVICE, SHOOTING APPARATUS AND INFORMATION PROCESSING METHOD

CROSS REFERENCE TO RELATED APPLICATION

This application claim is benefit of Japanese Application No. 2013-167607 in Japan on Aug. 12, 2013, the contents of which are incorporated by this reference.

BACKGROUND OF THE INVENTION

1. Field of the Invention

The present invention relates to an information processing device capable of processing an image and an audio, a shooting apparatus and an information processing method.

2. Description of the Related Art

Recently, devices capable of recording an image and an audio for a long time period have been widespread due to development of image and audio digital processing, coding techniques, integration techniques and the like. For example, among portable-type digital recorders, digital cameras and mobile phones and the like, there are a lot that can record an image and an audio. These recording apparatuses are miniaturized and weight-reduced with the use of a semiconductor memory as a recording medium.

Recording apparatuses of this kind are capable of shooting and recording in various scenes such as recording of a meeting, cries of wild birds, a sound of a brook, music and the like due to their outstanding portability. Furthermore, underwater cameras which can be used not only on land but also in water by adopting watertight construction have also been widespread, and shooting and recording is also possible even in water.

Furthermore, Japanese Patent Application Laid-Open Publication No. 2006-109322 discloses a device which combines a sound effect corresponding to an image and the image into an image.

SUMMARY OF THE INVENTION

An information processing device according to the present invention is provided with: an image meaning judgment section classifying and judging an inputted image as having a particular meaning by classifying characteristics of the image and referring to a database; an audio meaning judgment section classifying and judging an inputted audio as having a particular meaning by classifying characteristics of the audio and referring to a database; and an association control section outputting the inputted image and the inputted audio acquired at different timings mutually in association with each other on the basis of each of judgment results of the image meaning judgment section and the audio meaning judgment section.

A shooting apparatus according to the present invention is provided with: an image pickup section picking up an image of an object to obtain a picked-up image; a sound acquisition section acquiring a sound to obtain an audio; a temporary recording section recording the picked-up image and the audio; an image meaning judgment section judging a meaning of the picked-up image by referring a database and recording a judgment result; an audio meaning judgment section judging a meaning of the audio by referring a database and recording a judgment result; and a selection section reading out an audio corresponding to the picked-up image from the temporary recording section on the basis of the judgment result of the image meaning judgment section and outputting the audio in association with the picked-up image or reading out a picked-up image corresponding to the audio from the temporary recording section on the basis of the judgment result of the audio meaning judgment section and outputting the picked-up image in association with the audio.

An information processing method according to the present invention includes: an image meaning judgment section classifying and judging an inputted image as having a particular meaning by classifying characteristics of the image and referring to a database; an audio meaning judgment section classifying and judging an inputted audio as having a particular meaning by classifying characteristics of the audio and referring to a database; and an association control section outputting the inputted image and the inputted audio acquired at different timings mutually in association with each other on the basis of each of judgment results of the image meaning judgment section and the audio meaning judgment section.

The above and other objects, features and advantages of the invention will become more clearly understood from the following description referring to the accompanying drawings.

BRIEF DESCRIPTION OF THE DRAWINGS

FIG. 3 is an explanatory diagram for explaining content stored in an image meaning DB 14 and an audio meaning DB 15;

FIG. 9 is an explanatory diagram for explaining content to be recorded in an image meaning recording area and an audio meaning recording area;

FIG. 11 is an explanatory diagram for explaining content stored in a DB 26;

FIG. 13 is an explanatory diagram for explaining recorded content of judgment results of image and audio judgments in an example in FIG. 12;

DETAILED DESCRIPTION OF THE PREFERRED EMBODIMENTS

Embodiments of the present invention will be described in detail below with reference to drawings.

First Embodiment

Figure 1:
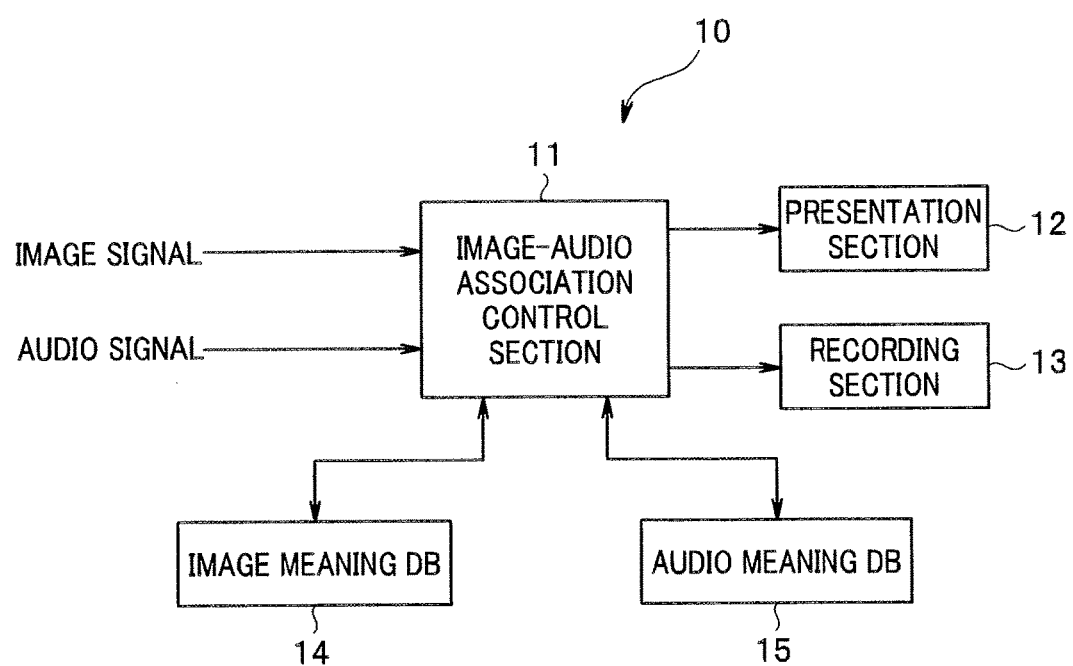
FIG. 1 is a block diagram showing a circuit configuration of an information processing device according to a first embodiment of the present invention.

FIG. 1 is a block diagram showing a circuit configuration of an information processing device according to the first embodiment of the present invention.

An information processing device 10 of the present embodiment is constituted by an image-audio association control section 11 capable of accessing an image meaning database (DB) 14 and an audio meaning database (DB) 15. At least one of an image and an audio to be associated is inputted to the image-audio association control section 11. The image-audio association control section 11 refers to the image meaning DB 14 on the basis of the inputted image to judge a meaning of the image. An image meaning judgment section is constituted by the image-audio association control section 11 and the image meaning DB 14. The image-audio association control section 11 also refers to the audio meaning DB 15 on the basis of the inputted audio to judge a meaning of the audio. An audio meaning judgment section is constituted by the image-audio association control section 11 and the audio meaning DB 15.

When an image is inputted, the image-audio association control section 11 acquires a meaning corresponding to the inputted image from the image meaning DB 14 and reads out an audio corresponding to the acquired meaning, that is, an audio related to the image from the audio meaning DB 15. The image-audio association control section 11 outputs the read-out audio and the inputted image in association with each other. That is, the image-audio association control section 11 as the image meaning judgment section performs judgment for classifying the inputted image as having a particular meaning by classifying characteristics of the image itself and referring to the image meaning DB 14.

When an audio is inputted, the image-audio association control section 11 acquires a meaning corresponding to the inputted audio from the audio meaning DB 15 and reads out an image corresponding to the acquired meaning, that is, an image related to the audio from the image meaning DB 14. The image-audio association control section 11 outputs the read-out image and the inputted audio in association with each other. That is, the image-audio association control section 11 as the audio meaning judgment section performs judgment for classifying the inputted audio as having a particular meaning by classifying characteristics of the audio itself and referring to the audio meaning DB 15.

Note that it becomes easier to construct a database in a natural language by performing classification as a meaning than simply performing classification, and it is possible to create a database using images and audios in a cloud and a language associated therewith as they are. It easily combines an audio and an image, and it also corresponds to a user's sense, sensibility and feeling. Of course, the databases can be simplified, and it is also possible to select a predetermined image or audio and perform natural language classification thereof to obtain meaning information. Here, the "meaning" refers to content indicated by words. When words refer to a certain matter, it can be defined as a "meaning".

An audio includes volume, a tone and the like. A musical instrument is identified thereby. For example, a name of the musical instrument, an event such as a concert related to the musical instrument, a musical number, a composer and the like can be used as a meaning.

Figure 2A:
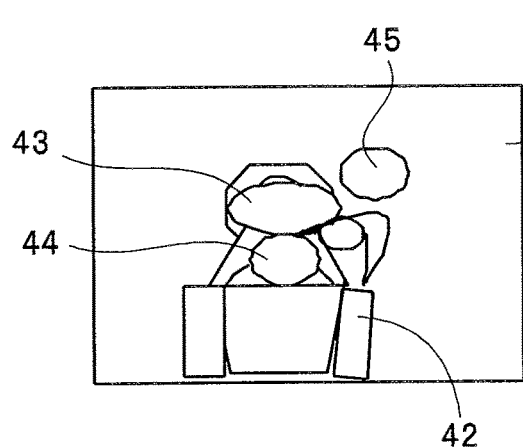
FIGS. 2A and 2B are explanatory diagrams for explaining a relation between an image and an audio.
Figure 2B:
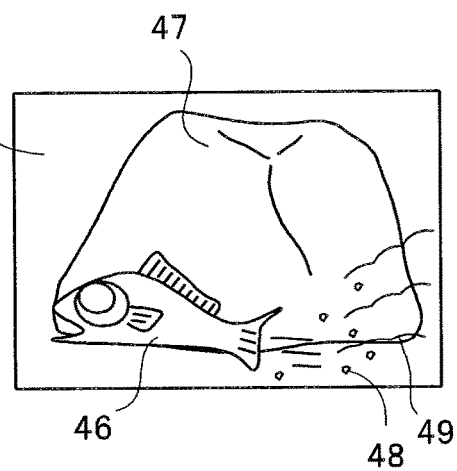

FIGS. 2A and 2B are explanatory diagrams for explaining a relation between an image and an audio; and FIG. 3 is an explanatory diagram for explaining content stored in the image meaning DB 14 and the audio meaning DB 15.

FIG. 2A shows an image of a person (diver) 42 playing scuba diving in water 41, and FIG. 2B shows an image of a fish 46 in the water 41. The diver 42 wearing swimming goggles 43 breathes in the water 41 via a regulator 44. FIG. 2A shows a state in which air is discharged from an exhaust valve of the regulator 44 not shown, and the discharged air rises in the water as bubbles 45.

If white blobs rising from vicinity of a person's face in an image against gravity are included in an image, as shown in FIG. 3, such an image can be judged to be an image of bubbles. In the image meaning DB 14, information is written which shows that a movie of white blobs rising from vicinity of a person's face as described above means bubbles.

On the other hand, in FIG. 2A, when the air is discharged and becomes the bubbles 45, and the bubbles rise in the water, a sound of small bubbles rising and a sound of large bubbles rising occur. As shown in FIG. 3, in the audio meaning DB 15, information about audio waveforms of the sound of small bubbles rising and the sound of large bubbles rising is written, and information which means bubbles is also written in association with the information about the audio waveforms and information showing that such repeated low-frequency sounds continue for several seconds.

When the diver 42 breathes via the regulator 44, an underwater breathing sound (hiss) and a heavy whistling sound, which are air sounds passing the regulator 44, are generated. In the audio meaning DB 15, information about audio waveforms of the underwater breathing sound (hiss) and the heavy whistling sound is written, and information which means breathing is also written in association with the information about the audio waveforms and information showing that the sounds are continuous sounds for about 2 seconds preceding sound of small bubbles rising and the sound of large bubbles rising at a low frequency described above. That is, in order to judge each meaning on the basis of the frequency and temporal change of a detected audio or judge each meaning on the basis of a particular pattern of the detected audio, the audio meaning DB described above records characteristics of the audio (frequencies, volumes and patterns of the underwater breathing sound (hiss), the heavy whistling sound or the like) and a meaning (sound of bubbles, breathing or gravel) in association with each other. Since sounds a diver hears when he performs shooting in water are limited, such DB creation can be relatively easily performed. Therefore, the audio meaning DB may be used exclusively for judgment in water. Otherwise, an audio which would never occur on land may be given a meaning or reproduced. A DB of shapes of cameras used in water or motions of a person may be created. Note that, though there are much more various sounds which can be heard on land, such a way of thinking may be followed. A shooting scene may be identified on the basis of clock information, GPS information, judgment about whether the scene is indoors or not, or the like to change a DB according to the scene, for example, in a manner that songs of cicadas are selected for a summer mountain scene.

Note that, in the image meaning DB 14, information which means breathing is written for an image of about 2 seconds preceding the movie of white blobs rising from vicinity of a person's face.

FIG. 2B shows a state in which a fish quickly moves from shade of a rock 47 and shows a state in which gravel 48 and sand 49 being swirled in a direction opposite to a direction of the movement of the fish 46. If a white granulated substance moving from downward of a fish toward a direction opposite to a direction of movement of the face of the fish is included in an image, such an image can be judged to be an image of a case where the fish existing on gravel or sand has moved. In the image meaning DB 14, information is written which indicates that it is meant that a fish moves above gravel or sand by such a movie of a white granulated substance moving toward a direction opposite to a direction of movement of the face of the fish. The above image meaning DB is what is obtained by associating characteristics of images with meanings and creating a database with them so that a meaning (bubbles, movement of gravel and the like) can be judged by a shade and shadow pattern (including colors) on a detected image or temporal change thereof, or a meaning (fish and the like) can be judged by a shade and shadow pattern and colors on a detected image. Since what a diver shoots in water is limited, such DB creation can be relatively easily performed. The image meaning DB may be used exclusively for judgment in water. Otherwise, giving of a meaning or reproduction which would never occur on land may be performed. In addition, a database of operation sounds of a camera, signs, conversations and the like may be created.

Such movement of gravel or sand due to a motion of a fish, a gravel crunching sound and a sand stirring sound occur. In the audio meaning DB 15, information about audio waveforms of the gravel crunching sound and the sand stirring sound is written, and information which means that gravel and sand move due to a motion of a fish is also written in association with the information about the audio waveforms and information showing that such a relatively high frequency sound disappears in about 0.5 seconds.

The image-audio association control section 11 can give an image and an audio mutually associated with each other to a presentation section 12. The presentation section 12 is constituted, for example, by a monitor and a speaker and outputs display based on the image from the image-audio association control section 11 and a sound based on the audio from the image-audio association control section 11.

The image-audio association control section 11 can also give the image and the audio mutually associated with each other to a recording section 13. The recording section 13 is adapted to be capable of recording the image and the audio from the image-audio association control section 11 to a recording medium not shown.

Note that the image-audio association control section 11 may be adapted to, when an image and an audio are inputted at the same time, output the image and an audio related to the image in association with each other only when the audio related to the image can be acquired on the basis of the image meaning DB 14 and the audio meaning DB 15. The image-audio association control section 11 may be adapted to, when an image and an audio are inputted at the same time, output the image and an audio related to the image in association with each other when the audio related to the image can be acquired on the basis of the image meaning DB 14 and the audio meaning DB 15, and immediately output the image and the audio which have been inputted when the audio elated to the image cannot be acquired.

Figure 4:
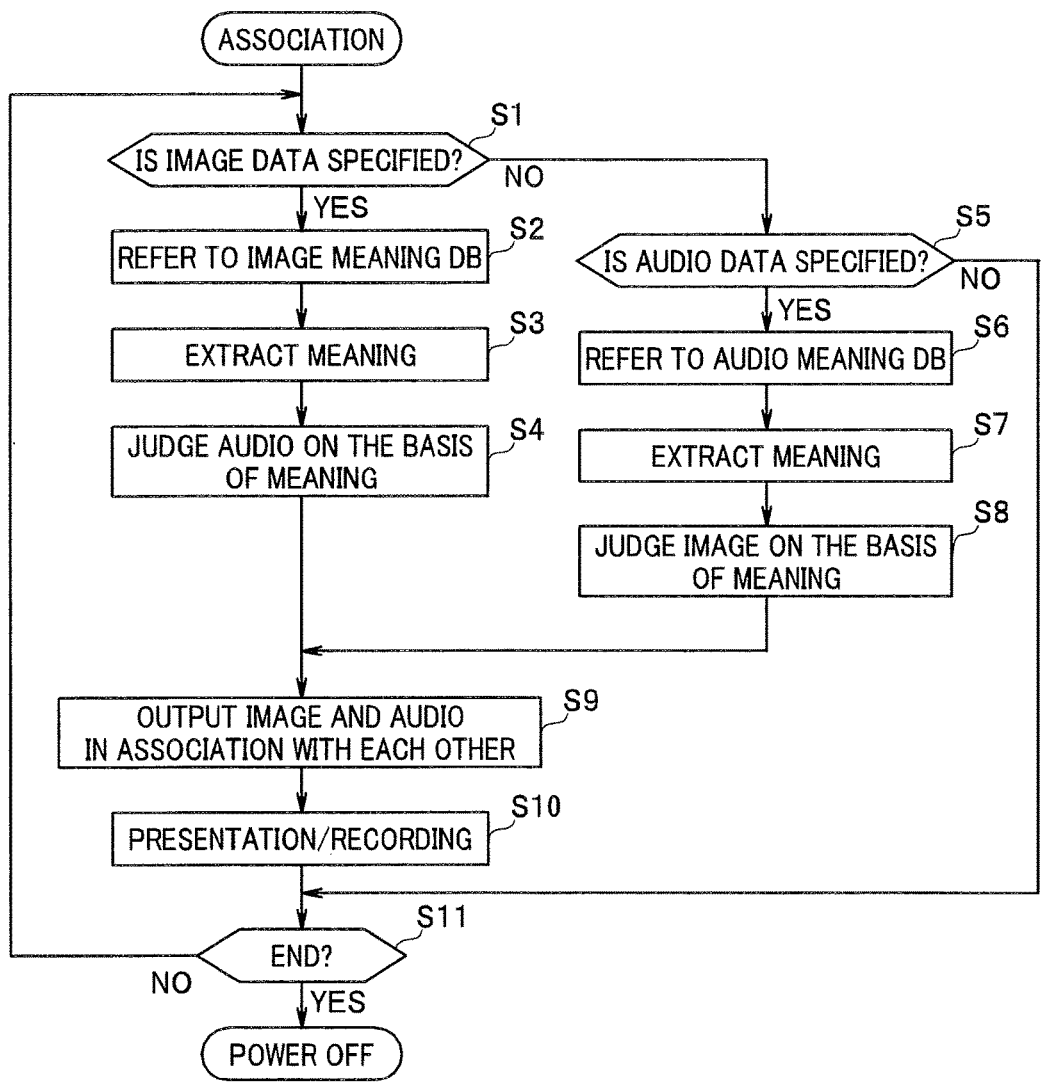
FIG. 4 is a flowchart for explaining an operation of a first embodiment.

Next, an operation of the embodiment configured as described above will be described with reference to FIG. 4. FIG. 4 is a flowchart for explaining the operation of the first embodiment.

At least one of an image and an audio to be associated is inputted to the image-audio association control section 11. The image-audio association control section 11 judges whether image data is specified or not at step S1 and judges whether audio data is specified or not at step S5. If image data is specified, the image-audio association control section 11 refers to the image meaning DB 14 (step S2), extracts a meaning based on the image data (step S3) and judges an audio on the basis of the extracted meaning (step S4).

For example, if the movie shown in FIG. 2A is inputted, the image-audio association control section 11 compares characteristics of the inputted image with characteristics of images written in the image meaning DB 14 and extracts a meaning assigned to an image which can be judged to have corresponding characteristics, that is, "bubbles". The image-audio association control section 11 reads out the sound of small bubbles rising and the sound of large bubbles rising stored in the audio meaning DB 15 being regarded as meaning "bubbles".

The image-audio association control section 11 associates the audio read out from the audio meaning DB 15 with the inputted image and outputs the audio and the image. Thereby, the sound of small bubbles rising and the sound of large bubbles rising are added to the image shown in FIG. 2A, that is, the image of the rising bubbles 45.

The image and the audio from the image-audio association control section 11 are presented by the presentation section 12 and recorded by the recording section 13 (step S10). It is judged at step S11 whether the process has ended or not, and steps S1 to S10 are repeated until the association process ends.

If audio data is specified, the image-audio association control section 11 refers to the audio meaning DB 15 at step S6 and extracts a meaning based on the audio data (step S7). For example, the image-audio association control section 11 compares characteristics of the inputted audio with characteristics of audios written in the audio meaning DB 15 and extracts a meaning assigned to an audio which can be judged to have corresponding characteristics. The image-audio association control section 11 judges an image on the basis of the extracted meaning (step S8).

Even if only an audio is inputted, the image-audio association control section 11 can output the inputted audio added with an image by the process of steps S5 to S8. Otherwise, it is possible to, even if an image and an audio are inputted, output an image extracted on the basis of the inputted audio instead of the original image.

Thus, in the present embodiment, it is possible to judge meanings of an image and an audio and output an image and an audio which have corresponding meanings in association with each other. Thereby, the present embodiment has an advantage that it is possible to, even if an audio corresponding to an image is not obtained or even if an image corresponding to an audio is not obtained, acquire an audio corresponding to the image or an image corresponding to the audio and present or record the image and the audio which are mutually related.

Second Embodiment

Figure 5:
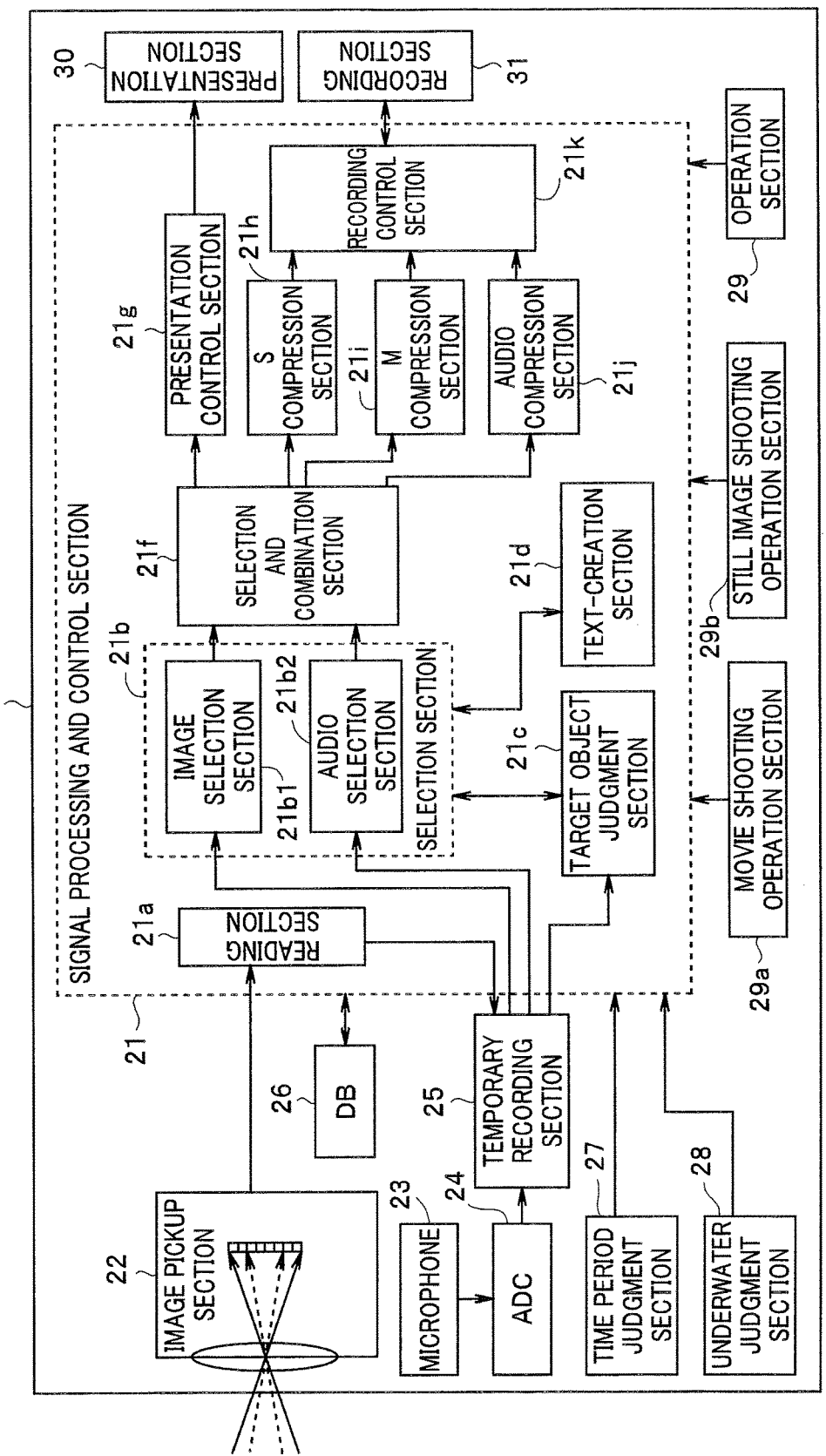
FIG. 5 is a block diagram showing a second embodiment of the present invention.

FIG. 5 is a block diagram showing a second embodiment of the present invention. The present embodiment shows an example of a case where an image-audio association control section of an information processing device is mounted on a shooting apparatus. In the first embodiment, description has been made on an example of extracting an audio or an image related to an image or an audio, respectively, using image data and audio data recorded in the image meaning DB 14 and the audio meaning DB 15 and outputting them in association with each other. In comparison, the present embodiment shows an example of using an image or an audio obtained by shooting to associate an audio or an image acquired at a different timing with the image or the audio and output them.

In this case also, by the image meaning judgment section judging a meaning on the basis of a detected shade and shadow pattern on a screen or temporal change in the pattern; the audio meaning judgment section judging each meaning on the basis of a detected frequency or temporal change of the audio; and performing association according to the meanings, the problem is solved. Note that the image meaning judgment section may judge a meaning on the basis of the detected shade and shadow pattern or colors on the screen, and the audio meaning judgment section may judge each meaning on the basis of a detected particular pattern of the audio.

In FIG. 5, a shooting apparatus 20 has an image pickup section 22 constituted by an image pickup device such as a CCD and a CMOS sensor. The image pickup section 22 is configured so as to be capable of controlling a diaphragm, focusing, zooming and the like by a signal processing and control section 21, and the image pickup section 22 is capable of performing image pickup according to various compositions and objects.

The image pickup section 22 is drive-controlled by the signal processing and control section 21 to pick up an image of an object and output a picked-up image. The signal processing and control section 21 is constituted by a CPU or the like, and outputs an image pickup device driving signal to the image pickup section 22 as well as reading out a picked-up image from the image pickup section 22. Taking-in of the picked-up image is performed by a reading section 21*a*. The reading section 21*a* gives the picked up image read out from the image pickup section 22 to a temporary recording section 25.

The shooting apparatus 20 has not only the image pickup section 22 but also a microphone 23 and is capable of not only shooting but also audio recording. An audio signal from the microphone 23 is given to an ADC 24. The ADC 24 converts the inputted audio signal to a digital signal and outputs the digital signal to the temporary recording section 25.

The temporary recording section 25 has a capacity enough to retain the picked-up image from the reading section 21*a* and the audio from the ADC 24 for a predetermined period and stores and holds the picked-up image (a movie and a still image) read out from the image pickup section 22 and the audio acquired by the microphone 23.

The image temporarily recorded in the temporary recording section 25 is given to a target object judgment section 21*c* and an image selection section 21*b*1 of a selection section 21*b*, and the audio temporarily recorded in the temporary recording section 25 is given to the target object judgment section 21*c* and an audio selection section 21*b*2 of the selection section 21*b*.

The shooting apparatus 20 is provided with a DB 26. The DB 26 has a configuration similar to those of the image meaning DB 14 and the audio meaning DB 15 in FIG. 1. For information about image characteristics, information about a meaning corresponding to the image characteristics is written, and, for information about audio characteristics, information about a meaning corresponding to the audio characteristics is written. To the target object judgment section 21*c* of the signal processing and control section 21, the picked-up image and the audio are inputted from the temporary recording section 25, and information about a time period of image pickup by the image pickup section 22 and a time period of sound acquisition by the microphone 23 are also given from a time period judgment section 27.

The target object judgment section 21*c* is adapted to judge a meaning of the inputted picked-up image by referring to the DB 26 and record a judgment result in an image meaning recording area of the temporary recording section 25 together with information about an image pickup time period. The target object judgment section 21*c* is adapted to judge a meaning of the inputted audio by referring to the DB 26 and record a judgment result in an audio meaning recording area of the temporary recording section 25 together with information about a sound acquisition time period. Note that such meaning judgment by the target object judgment section 21*c* may be performed at the time of shooting a movie or a still image or may be performed at the time of displaying a through image.

The selection section 21*b* is controlled by the target object judgment section 21*c* to select an audio corresponding to an image or an image corresponding to an audio in an image-audio association mode. That is, in the image-audio association mode, the target object judgment section 21*c* reads out the meaning judgment result and the image pickup time period of the image from the temporary recording section 25 as well as reads out the meaning judgment result and the sound acquisition time period of the audio to control selection of the selection section 21*b*. Thereby, the image selection section 21*b*1 and the audio selection section 21*b*2 are controlled by the target object judgment section 21*c* to read out an image and an audio having a common meaning judgment result from the temporary recording section 25 and output the image and the audio.

For example, when an image is a basis, the image selection section 21*b*1 successively reads out movies recorded in the temporary recording section 25. On the other hand, the audio selection section 21*b*2 successively reads out audios corresponding to meaning judgment results at respective timings of the movies being read out by the image selection section 21*b*1, respectively, from the temporary recording section 25 and outputs the audios in a manner that an output time period of the audio corresponds to an output time period of an image having the meaning. In this way, an image and an audio mutually having a common meaning are outputted to a selection and combination section 21*f* from the image selection section 21*b*1 and the audio selection section 21*b*2 at the same time.

Note that a text-creation section 21*d* is adapted to be capable of generating text based on audio information in DB 26 and providing text information to the selection section 21*b*. The image selection section 21*b*1 is also capable of combining text corresponding to an image from the temporary recording section 25 with the image and output a combination result.

The selection and combination section 21*f* combines the inputted image and audio and outputs a combination result to a presentation control section 21*g*, an S compression section 21*h*, an M compression section 21*i* and an audio compression section 21*j*. The image-audio association control section is constituted by these selection section 21*b*, target object judgment section 21*c*, text-creation section 21*d* and selection and combination section 21*f*.

The presentation control section 21*g* performs a process for giving the inputted movie or still image and audio to a presentation section 30 to cause the presentation section 30 to perform display and audio output. The presentation section 30 is constituted by a monitor constituted by an LCD or the like and a speaker, and the presentation section 30 displays the movie or still image given from the presentation control section 21g as well as outputting a sound based on the given audio.

The S compression section 21h compresses the inputted still image and gives it to a recording control section 21k, and the M compression section 21i compresses the inputted movie and gives it to the recording control section 21k. The audio compression section 21j compresses the inputted audio and gives it to the recording control section 21k. The recording control section 21k gives the compressed movie or the compressed still image and the compressed audio to a recording section 31 and causes the recording section 31 to record them. The recording section 31 is controlled by the recording control section 21k to record the compressed movie or the compressed still image and the compressed audio which have been inputted. For example, a card interface can be adopted as the recording section 31, and the recording section 31 is capable of recording image information, audio information and the like in a recording medium such as a memory card.

The shooting apparatus 20 is also provided with an operation section 29. The operation section 29 has various switches and buttons for setting of a shooting mode and the like, and the operation section 29 generates an operation signal based on a user operation and provides it to the signal processing and control section 21. For example, in FIG. 5, a movie shooting operation section 29a and a still image shooting operation section 29b are shown as a specific example of the operation section 29. The movie shooting operation section 29a is for specifying movie shooting, and an operation signal for starting movie shooting is provided to the signal processing and control section 21 by the movie shooting operation section 29a being operated. The still image shooting operation section 29b is for specifying still image shooting, and an operation signal for starting still image shooting is provided to the signal processing and control section 21 by the still image shooting operation section 29b being operated. The signal processing and control section 21 controls each section on the basis of an operation signal.

Furthermore, a touch panel can be adopted as the operation section 29. For example, by providing a touch panel as the operation section 29 on a display screen of the presentation section 30 not shown, an operation signal corresponding to a position on the display screen pointed by a user's finger can be generated.

The shooting apparatus 20 is also provided with an underwater judgment section 28. The underwater judgment section 28 is adapted to be capable of judging whether the shooting apparatus 20 is in water or not, for example, by water pressure detection or the like and outputting a judgment result to the signal processing and control section 21.

Figure 6:
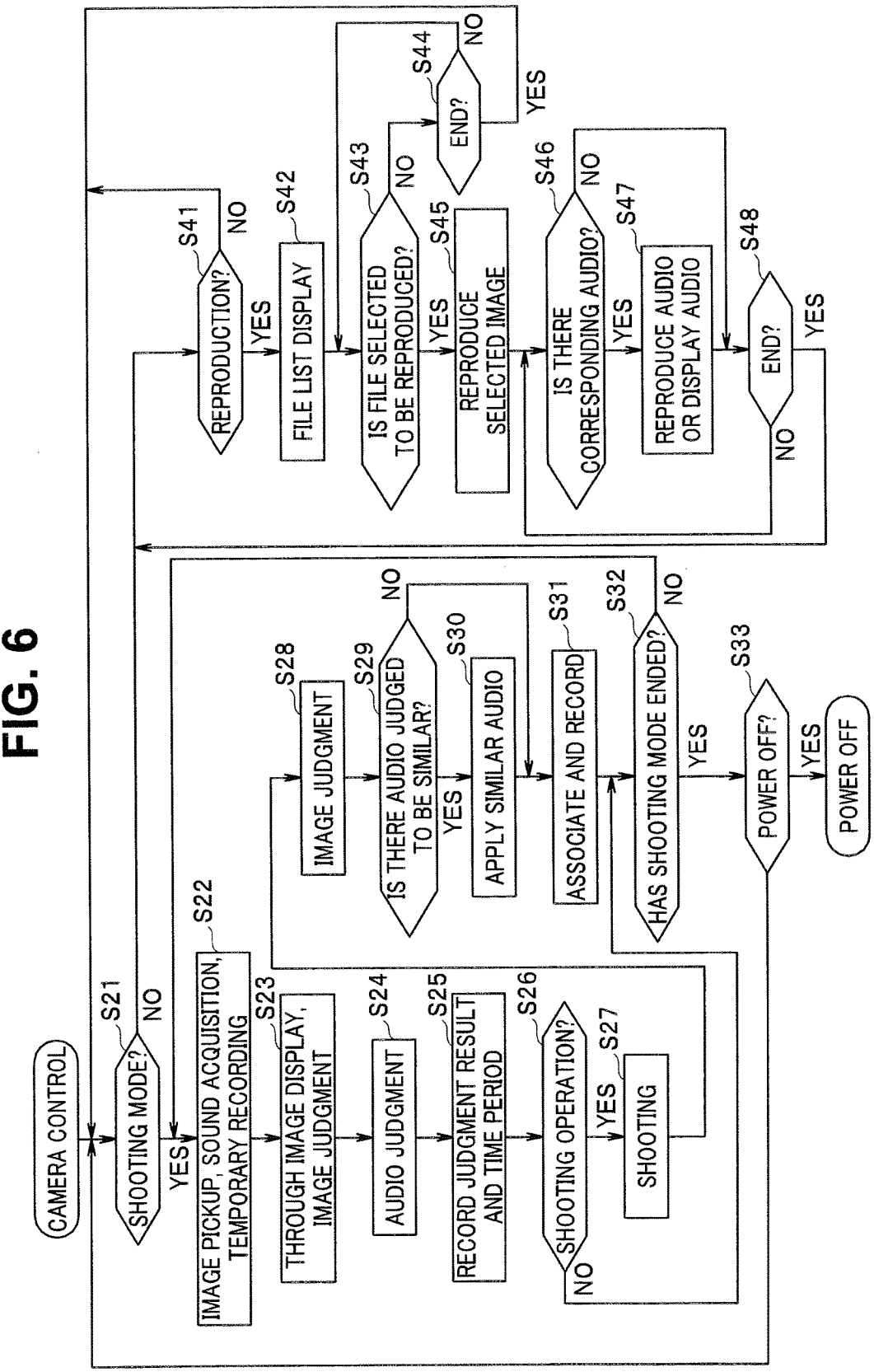
FIG. 6 is a flowchart showing camera control.
Figure 7:
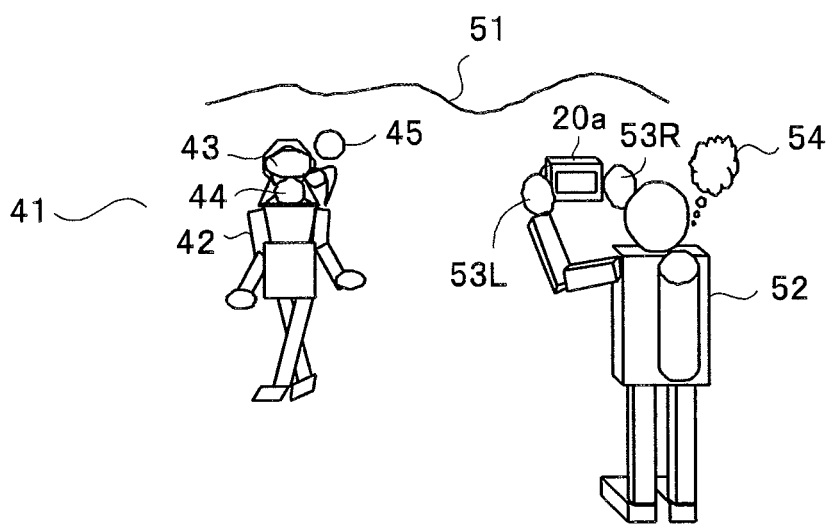
FIG. 7 is an explanatory diagram showing a state of shooting in water.
Figure 8:
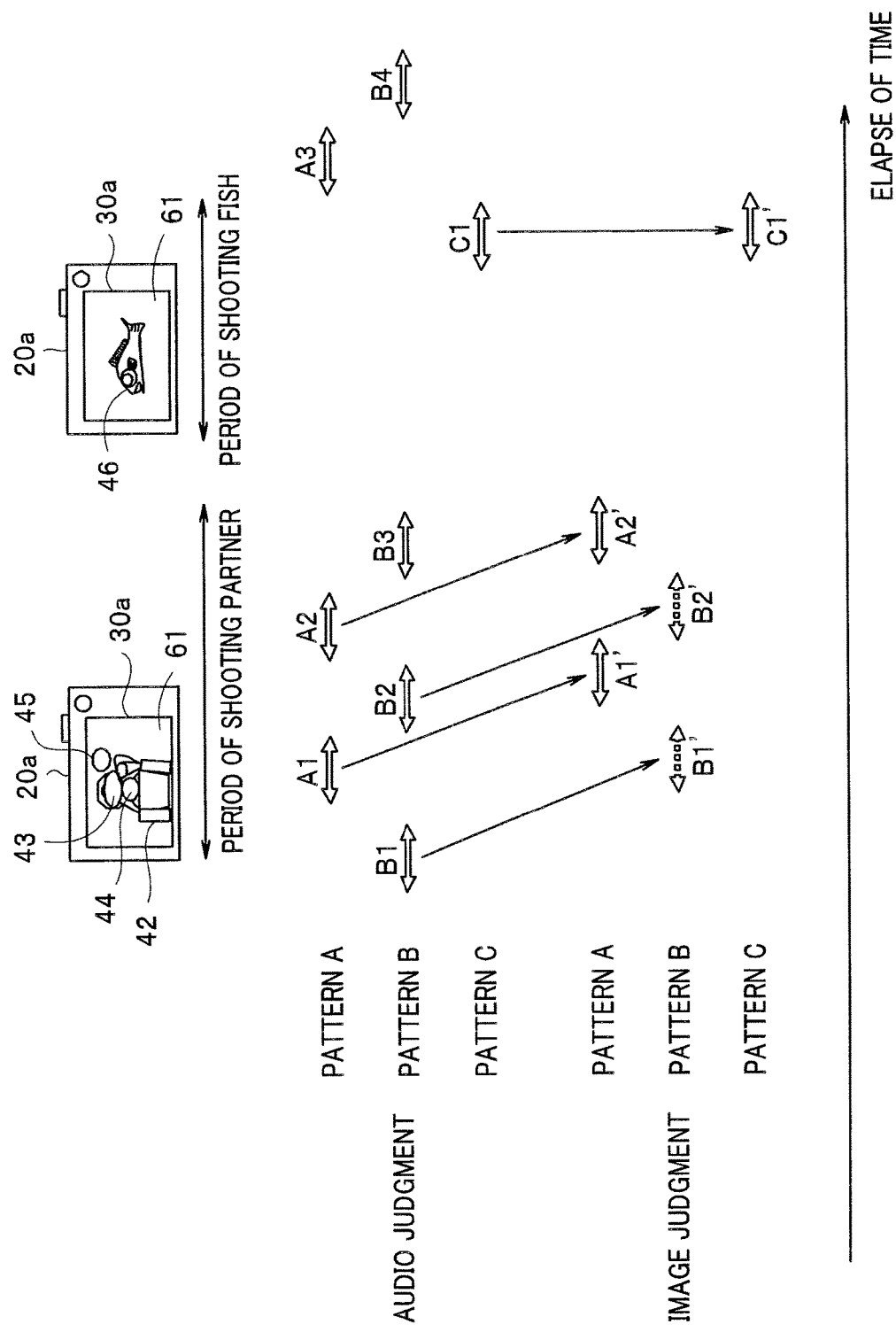
FIG. 8 is an explanatory diagram for explaining image and audio judgment.

Next, an operation of the embodiment configured as described above will be described with reference to FIGS. 6 to 9. FIG. 6 is a flowchart showing camera control. FIG. 7 is an explanatory diagram showing a state of shooting in water; FIG. 8 is an explanatory diagram for explaining image and audio judgment; and FIG. 9 is an explanatory diagram for explaining content to be recorded in an image meaning recording area and an audio meaning recording area.

It is assumed that two divers 42 and 52 are playing scuba diving in the water 41. The diver 42 wearing swimming goggles 43 breathes via a regulator 44, and bubbles 45 accompanying the breathing are about to rise from a side of a face of the diver 42. The diver 52 is going to perform shooting with the diver 42 as an object, holding a case 20a containing the shooting apparatus 20 by right and left hands 53R and 53L. The diver 52 also breathes via a regulator not shown, and bubbles 54 emerge accompanying the breathing.

When the shooting apparatus 20 is powered on, the signal processing and control section 21 judges whether the shooting mode is specified or not at step S21 in FIG. 6. If judging at step S21 that the shooting mode is specified, the signal processing and control section 21 performs image pickup and sound acquisition and temporarily records a picked-up image and an audio to the temporary recording section 25 at step S22. That is, the signal processing and control section 21 acquires the picked-up image from the image pickup section 22 and gives it to the temporary recording section 25 to record it. The audio acquired by the microphone 23 is given and recorded to the temporary recording section 25 after being converted to a digital signal by the ADC 24.

Next, the signal processing and control section 21 performs through image display and also performs image judgment at step S23. That is, the signal processing and control section 21 reads out the image and the audio recorded in the temporary recording section 25 and provides the image and the audio to the presentation control section 21g via the selection section 21b and the selection and combination section 21f. The presentation control section 21g causes an image based on the picked-up image on the display screen of the presentation section 30. The presentation control section 21g may perform sound output of the audio acquired from the presentation section 30.

In the present embodiment, the target object judgment section 21c of the signal processing and control section 21 reads an image from the temporary recording section 25, judges a meaning of the image by referring to the DB 26, and records a judgment result and an image pickup time period to the image meaning recording area of the temporary recording section 25. At the next step S24, the target object judgment section 21c reads out an audio from the temporary recording section 25, judges a meaning of the audio by referring to the DB 26, and records a judgment result and a sound acquisition time period to the audio meaning recording area of the temporary recording section 25 (step S25).

At step S26, the signal processing and control section 21 judges whether a shooting operation has been performed or not. If a photographer has performed a shooting operation, the signal processing and control section 21 advances the process to step S27 and performs shooting. Thus, in the present embodiment, when the shooting mode is specified, image pickup and sound acquisition are performed and temporary recording is performed before the photographer performs a shooting operation. Then, meanings of the picked-up image and audio which have been temporarily recorded are judged by referring to the DB 26, and time period information indicating an image part and an audio part which have been judged to have the meanings is temporarily recorded together with the judged meanings. Note that such a meaning judgment and recording process may be performed not only before shooting but also during shooting, after shooting or during reproduction.

FIG. 8 shows an example of a temporal relationship between meaning judgment and shooting. Note that, hereinafter, description will be made on an example of, on the basis of an image, extracting an audio corresponding to a meaning of the image and associating the audio with the image for use. The example in FIG. 8 shows that the diver 52 in FIG. 7 is shooting a fish swimming in the water after shooting the diver 42 who is a partner. On a back of the case 20a of the shooting apparatus 20 the diver 52 holds, a display screen 30a constituting the presentation section 30 is provided. During a period of shooting of the diver 42 who is a partner, the diver 42 is displayed on the display screen 30a as a through image 61. During a period of shooting of the fish, a through image 61 which includes an image of the fish 46 is displayed on the display screen 30a.

When a shooting operation is performed, the target object judgment section 21c of the signal processing and control section 21 performs image judgment successively for current picked-up images temporarily recorded to the temporary recording section 25 from the image pickup section 22 via the reading section 21a, at step S28. At step S29, the target object judgment section 21c judges whether or not a judgment result that a meaning is the same as a meaning obtained by the image judgment is recorded in the audio meaning recording area, and outputs a judgment result to the selection section 21b.

The image selection section 21b1 of the selection section 21b reads out an image currently being shot from the temporary recording section 25 and outputs the image. On the other hand, the audio selection section 21b2 reads out an audio part having a same meaning as a meaning of the image being selected by the image selection section 21b1 based on a judgment result by the target object judgment section 21c from the temporary recording section 25 and outputs the audio part.

In FIG. 8, a pattern A indicates that a pattern of an image or an audio means, for example, the bubbles in FIG. 3, a pattern B indicates that a pattern of an image or an audio means, for example, the breathing in FIG. 3, and a pattern C indicates that a pattern of an image or an audio means, for example, the fish moving above the gravel/sand in FIG. 3.

Audio judgment in FIG. 8 indicates a result of audio judgment before shooting or during shooting, and an arrow indicates that an audio acquired during a period indicated by the arrow has been judged to be an audio having a meaning. During the period of shooting of the diver 42 who is a partner, the photographer is breathing. By the breathing, for example, the underwater breathing sound (hiss) is judged as breathing judgments B1 to B3, and a sound acquisition time period and the meaning (pattern) are recorded in the audio meaning recording area.

FIG. 9 shows content recorded in the audio meaning recording area and the image meaning recording area and shows that, for example, an audio judged to have a meaning of breathing (pattern B) has been recorded to the temporary recording section 25 during a sound acquisition time periods of 28 to 30 seconds, 34 to 36 seconds and 41 to 43 seconds. Note that a same time base is used mutually between a sound acquisition time period and an image pickup time period, and a recording position in the temporary recording section 25 is made clear from the sound acquisition time period and the image pickup time period.

During the period of shooting the diver 42, for example, the sound of small bubbles rising is judged as bubbles judgments A1 and A2 by bubbles emerging accompanying the breathing of the photographer, and a sound acquisition time period and the meaning (pattern) are recorded to the audio meaning recording area.

When bubbles emerging from the vicinity of the face of the diver 42 are judged as bubbles judgments A1' and A2' by image judgment of the current picked-up image, that is, on the basis of a picked-up image of the diver 42, the audio selection section 21b2 specifies, according to the judgment result, a recording position in the temporary recording section 25 on the basis of a sound acquisition time period of the audio judged as the bubbles judgments A1 and A2 to read out an audio. In this way, the audio of the parts of the bubbles judgments A1 and A2 is selected and outputted as an audio of parts of the bubbles judgments A1' and A2'.

For example, in the example in FIG. 9, an audio acquired and temporarily recorded during a sound acquisition time period 30 to 33 seconds is selected to correspond to an image of an image pickup time period 35 to 38 seconds. An audio acquired and temporarily recorded during a sound acquisition time period 37 to 40 seconds is selected to correspond to an image of an image pickup time period 42 to 45 seconds.

As for time periods before the bubbles judgments A1' and A2', breathing judgments B1' and B2' are performed, and audios of sound acquisition time periods 28 to 30 seconds and 34 to 36 seconds are selected to correspond to images of image pickup time periods 32 to 34 seconds and 39 to 41 seconds, respectively, and outputted.

In the example in FIG. 8, it is shown that a silent state continued for a while after the diver 52 started shooting of the fish 46 because he performed shooting with bated breath. FIG. 8 also shows that a meaning of a sound the fish 46 has made when swimming away is judged as a judgment C1. FIG. 9 shows that, for example, the gravel crunching sound was judged by movement of the fish 46 and recorded during a period of 61 to 62 seconds. The sound is generated from an object, and the target object judgment section 21c controls the audio selection section 21b2 to use an actual sound, that is, a sound being acquired immediately as shown in FIG. 9.

An image and an audio selected by the image selection section 21b1 and the audio selection section 21b2 are given to the selection and combination section 21f and combined. Being compressed by the S compression section 21h, the M compression section 21i and the audio compression section 21j, the combined image and audio are given to the recording control section 21k and recorded to the recording section 31 (step S31).

The signal processing and control section 21 judges whether an operation of ending the shooting mode has been performed or not at step S32, and repeats the above process until the end operation is performed. When the operation of ending the shooting mode is performed, the signal processing and control section 21 judges whether a power-off operation has been performed or not at step S33. If the power-off operation is not performed, the signal processing and control section 21 returns the process to step S21. If the power-off operation is performed, the signal processing and control section 21 ends the process.

On the other hand, if the shooting mode is not specified, the signal processing and control section 21 judges whether a reproduction mode has been specified or not at step S41. If a reproduction button or the like is operated, the signal processing and control section 21 transitions to the reproduction mode, reads information about a list of files recorded in the recording section 31 and causes the presentation section 30 to display a file list display, at step S42.

When the user selects a file while the file list is displayed (step S43), the signal processing and control section 21 reads the selected file from the recording section 31, performs decoding processing and reproduces an image signal and an audio signal (step S45). The signal processing and control section 21 gives the reproduced image signal and audio signal to the presentation section 30 to display the image signal and the audio signal.

In the present embodiment, it is possible to associate an image and an audio not only at the time of recording but also at the time of reproduction. While an image is being reproduced, the signal processing and control section 21 judges a meaning of the image by the target object judgment section 21*c* and also judges whether an audio having the judged meaning is recorded in the temporary recording section 25 or not (step S46). When the audio related to the image is recorded, the signal processing and control section 21 outputs the audio read out from the temporary recording section 25 in association with the image being reproduced, at step S47. Thus, even if an image and an audio are not associated at the time of recording, a related audio can be associated with a reproduced image and outputted at the time of reproduction.

At step S47, by using an image of text created by the text-creation section 21*d*, text corresponding to an audio can be displayed instead of the audio.

Note that, if an end operation is performed when the file list is displayed, the signal processing and control section 21 moves the process from step S44 to step S21 and ends the reproduction mode.

Thus, in the present embodiment, meanings of an acquired image and audio are judged, and an image and an audio which are mutually related are obtained with the use of an image or audio having a corresponding meaning which has been already recorded, prior to actual recording. Thereby, even if an audio corresponding to an image is not obtained, or even if an image corresponding to an audio is not obtained, it is possible to obtain an audio corresponding to the image or an image corresponding to the audio to present or record an image and an audio which are mutually related. For example, even in the case where an audio corresponding to an image of an object is not acquired such as the case of shooting in water, it is possible to associate a corresponding audio with the image of the object and output the image and the audio by using an audio acquired at a different timing, so that it is possible to present an image and an audio without a feeling out of place.

Note that, though description has been made on the example of extracting an audio corresponding to an image on the basis of the image in FIG. 6, it is also possible to extract a corresponding image on the basis of an audio. Since it is difficult to perform sound acquisition in water, a corresponding audio may be extracted on the basis of an image if it is shown by a judgment result of the underwater judgment section 28 that shooting is performed in water.

Another Example

FIGS. 10A to 10D and FIGS. 11 to 13 are explanatory diagrams showing another example in the second embodiment. FIGS. 10A to 10D and FIGS. 11 to 13 are explanatory diagrams showing an example of automatically acquiring a suitable sound as a background sound during shooting, before the shooting.

FIGS. 10A to 10D are for explaining a relation between an image and an audio, and FIG. 11 is for explaining content stored in the DB 26. In this case also, by the image meaning judgment section judging a meaning on the basis of a detected shade and shadow pattern on a screen or temporal change in the pattern; the audio meaning judgment section judging a meaning on the basis of a detected frequency or temporal change of the audio; and performing association according to the meanings, the problem is solved. Note that the image meaning judgment section may judge a meaning on the basis of the detected shade and shadow pattern or colors on the screen, and the audio meaning judgment section may judge each meaning on the basis of a detected particular pattern of the audio. It can be said that the former is rough schematic judgment and is appropriate for a background image or audio, and the latter is appropriate for a particular detailed image or audio of a main object.

Figure 10A:
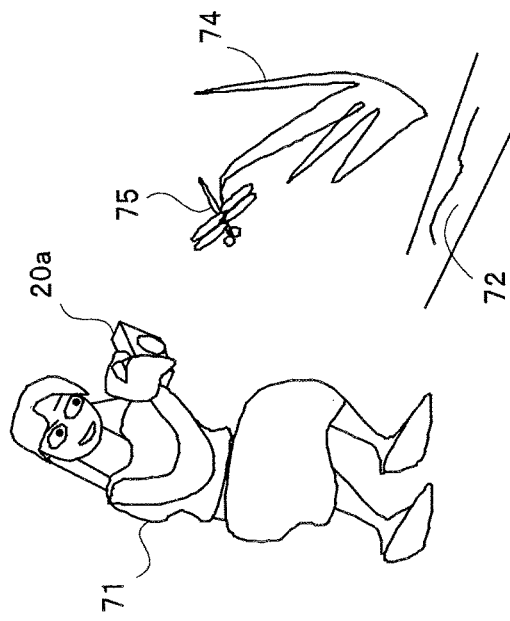
FIGS. 10A to 10D are explanatory diagrams for explaining a relation between an image and an audio.
Figure 10B:
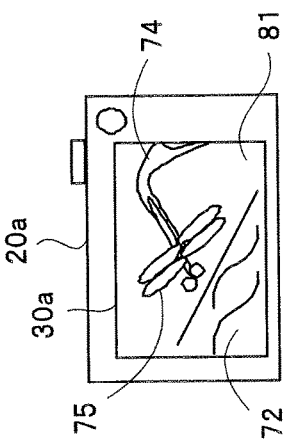
Figure 10C:
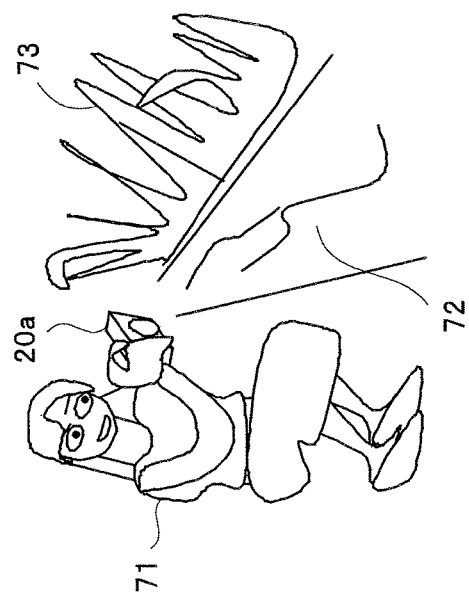
Figure 10D:
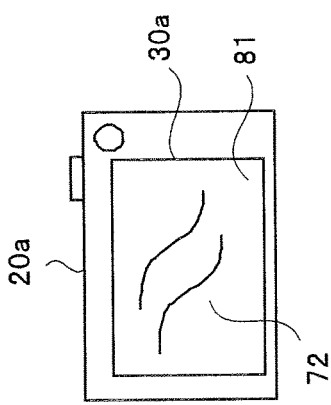

FIG. 10A shows a state of a person 71 holding up the case 20*a* of the shooting apparatus 20 beside a river 72, and FIG. 10B shows a through image 81 displayed on the display screen 30*a* of the shooting apparatus 20 in the state of FIG. 10A. Though there is grass 73 beside the river 72, the person 71 holds up the shooting apparatus 20 near the river 72 with mainly only the river 72 as a shooting range. FIG. 10C shows a state of the person 71 shooting a dragonfly 75, and FIG. 10D shows an image displayed on the display screen 30*a* of the shooting apparatus 20 in the state of FIG. 10C. On a through image 81 on the display screen 30*a*, an image is displayed in which the grass 74 is beside the river 72, and the dragonfly 75 is on the grass 74.

As shown in FIG. 11, information for judging, if glittering portions moving in a same direction are included in an image, that such a movie means an image of a river is written in the DB 26. In FIG. 10A, for example, a brook rippling sound and a river rushing sound are generated by water flowing in the river 72. As shown in FIG. 11, in the DB 26, information about audio waveforms of the brook rippling sound and the river rushing sound is written. Information which means a river is also written in association with the information about the audio waveforms and information indicating that such repeated low-frequency sounds continue in an about one-second cycle. That is, a meaning of a sound is judged on the basis of a frequency, a strength pattern and the like. A river can be judged on the basis of color, change in a position direction to a flow direction, and an image pattern like glittering.

Note that, in FIG. 11, information about waves at sea is also written. Information for judging, when whitecaps moving and returning back in a same way are detected in an image, that such a movie means waves is written. If such waves occur, a repeated low-frequency sound, for example, in four-second cycle such as a waves surging sound and a waves splashing sound occurs. In the DB 26, information about audio waveforms of such sounds of the waves surging sound and the waves splashing sound is written, and information which means waves is also written in association with the information about the audio waveforms and information showing that the low frequency is, for example, in a four-second cycle.

In FIG. 11, information about a bird is also written. Information for judging, when a face of a bird or a small flying substance is detected in an image, that such an image means a bird is written. A bird makes, for example, a small bird's tweet, a large bird's squawk or the like. In the DB 26, information about audio waveforms of the small bird's tweet and the large bird's squawk is written, and information which means a bird is also written in association with the information about the audio waveforms or information about audio waves of notes of various birds and sounds of particular frequency bands corresponding to notes of birds. In this case, even though a bird, a dragonfly and the like are particular detailed main objects, it is image identification on the basis of a shade and shadow pattern, a shape, color distribution and the like that is suitable for such an image and audio.

In the present embodiment, it is possible to record an image and an audio in the state of displaying a through image before shooting, and it is possible, for example, to recognize a meaning of an audio by referring to the DB 26 and record a recording position of the audio together with a meaning judgment result, as described above.

Now, it is assumed that the person 71 shown in FIGS. 10A to 10D performs shooting of the dragonfly 75 near the river 72. There may be a case where, even if not only the dragonfly 75 but also the river 72 is included in a shooting range, a sound of the river 72 cannot be acquired according to a positional relationship between the shooting apparatus 20 and the dragonfly 75. In this case, the person 71 holds up the shooting apparatus 20 toward a surface of the river 72, near the river 72 as shown in FIG. 10A.

Figure 12:
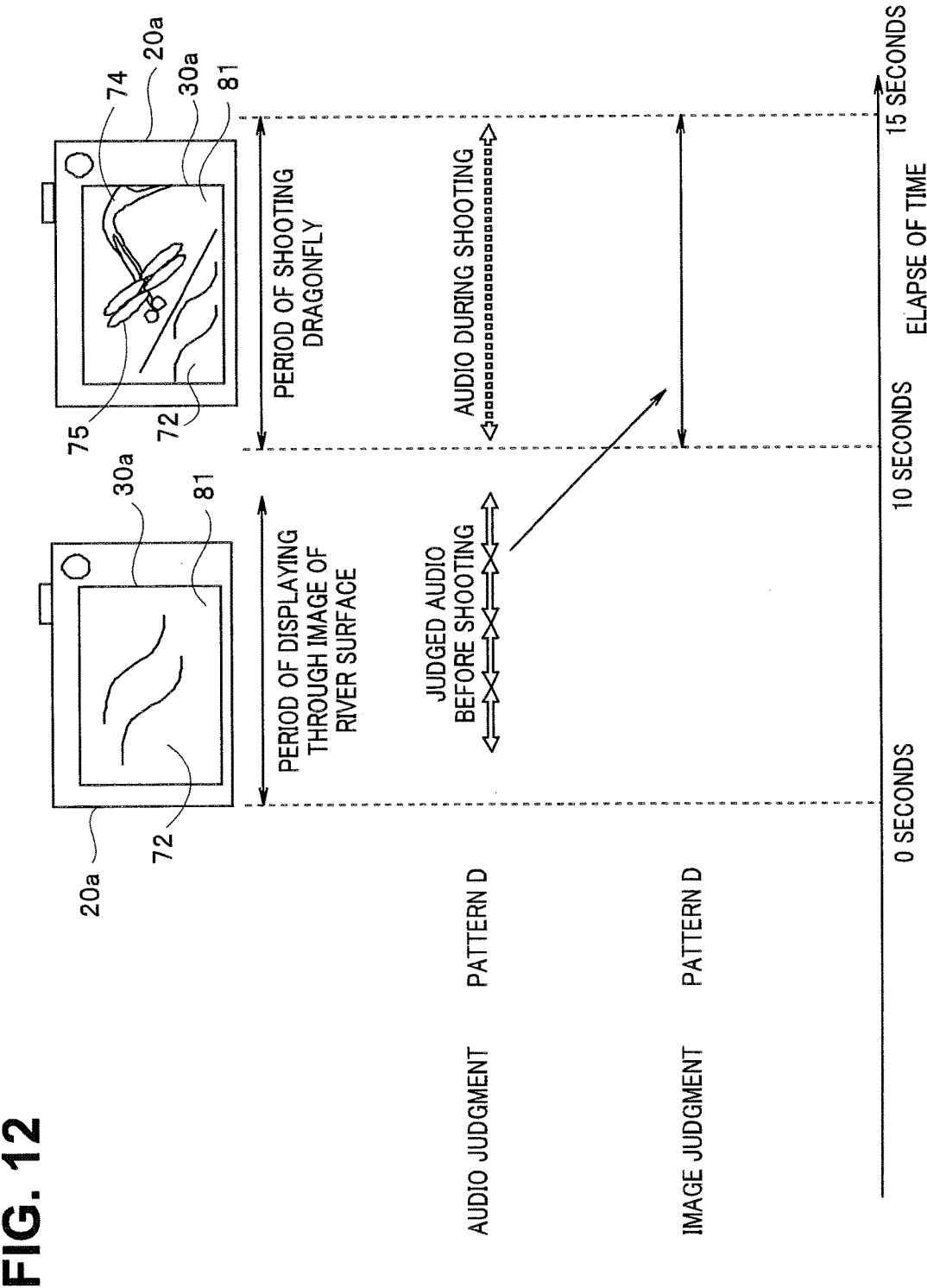
FIG. 12 is an explanatory diagram for explaining a state of shooting at a riverside.

FIG. 12 is an explanatory diagram for explaining such a state of shooting at a riverside. As shown in FIG. 12, a period of displaying a through image of the river surface is provided before a period of shooting the dragonfly. If the shooting mode is specified, a picked-up image and an audio from the microphone 23 are recorded to the temporary recording section 25 even while a through image is displayed. By referring to the DB 26, the target object judgment section 21c judges that an audio which means the sound of the river 72 has been inputted. Information about a judgment result and a sound acquisition time period is recorded in the audio meaning recording area of the temporary recording section 25.

FIG. 13 is an explanatory diagram for explaining recorded content of the judgment results of the image and audio judgments in the example in FIG. 12. In FIGS. 12 and 13, a pattern D shows that an image or audio pattern means, for example, the river in FIG. 11. In FIG. 13, it is seen that the audio which means a river has been acquired for 0 to 15 seconds. Note that a pattern E in FIG. 13 shows that an image or audio pattern means, for example, the waves in FIG. 11, and a pattern F shows that an image or audio pattern means, for example, the bird in FIG. 11.

For example, as shown in FIG. 12, it is assumed that movie shooting of the dragonfly 75 is performed for 5 seconds, after 10 seconds on the basis of a time point when the person 71 holds up the shooting apparatus 20 so that the river 72 is displayed as a through image and transitions to the shooting mode. FIG. 13 shows that acquisition of the sound of the river 72 includes relatively much noise for 3 seconds after start of temporary recording in the state of displaying the through image of the river 72; favorable sound acquisition is performed for 3 to 6 seconds when the shooting apparatus 20 is near the river 72; and a sound acquisition level is low for 10 to 15 seconds when the shooting apparatus 20 is away from the river 72 to shoot the dragonfly 75.

When shooting is started, the target object judgment section 21c judges that a partial image of a picked-up image means a river by referring to the DB 26. The target object judgment section 21c also performs judgment about an inputted audio by referring to the DB 26. In this case, the target object judgment section 21c judges that the inputted audio is a sound of a river by referring to the DB 26, and the target object judgment section 21c also judges noise strength and level height. By comparing the judgment result for the inputted audio with a judgment result for an audio judged to be a sound of a river, which is recorded in the temporary recording section 25, the target object judgment section 21c controls the selection section 21b to select an audio with little noise and a sufficient level.

In the example in FIG. 13, the audio of 3 to 6 seconds acquired during the through image display period is favorable as a sound of a river, and the audio selection section 21b2 selects and outputs the audio part judged to be a sound of a river, which has been read out from the temporary recording section 25, instead of the audio currently being acquired, for the image currently being picked up.

Note that the audio selection section 21b2 is controlled by the target object judgment section 21c to repeatedly read out and output the audio judged to be a sound of a river during a time period corresponding to a shooting time period of the image of the river. Thereby, it is possible to output an audio related to an image during a whole period of the corresponding image irrespective of a sound acquisition time period.

Thus, even if a background sound cannot be appropriately recorded at the time of shooting, it is possible to obtain a picked-up image having a favorable background sound by using a background sound automatically acquired before the shooting.

Third Embodiment

Figure 14:
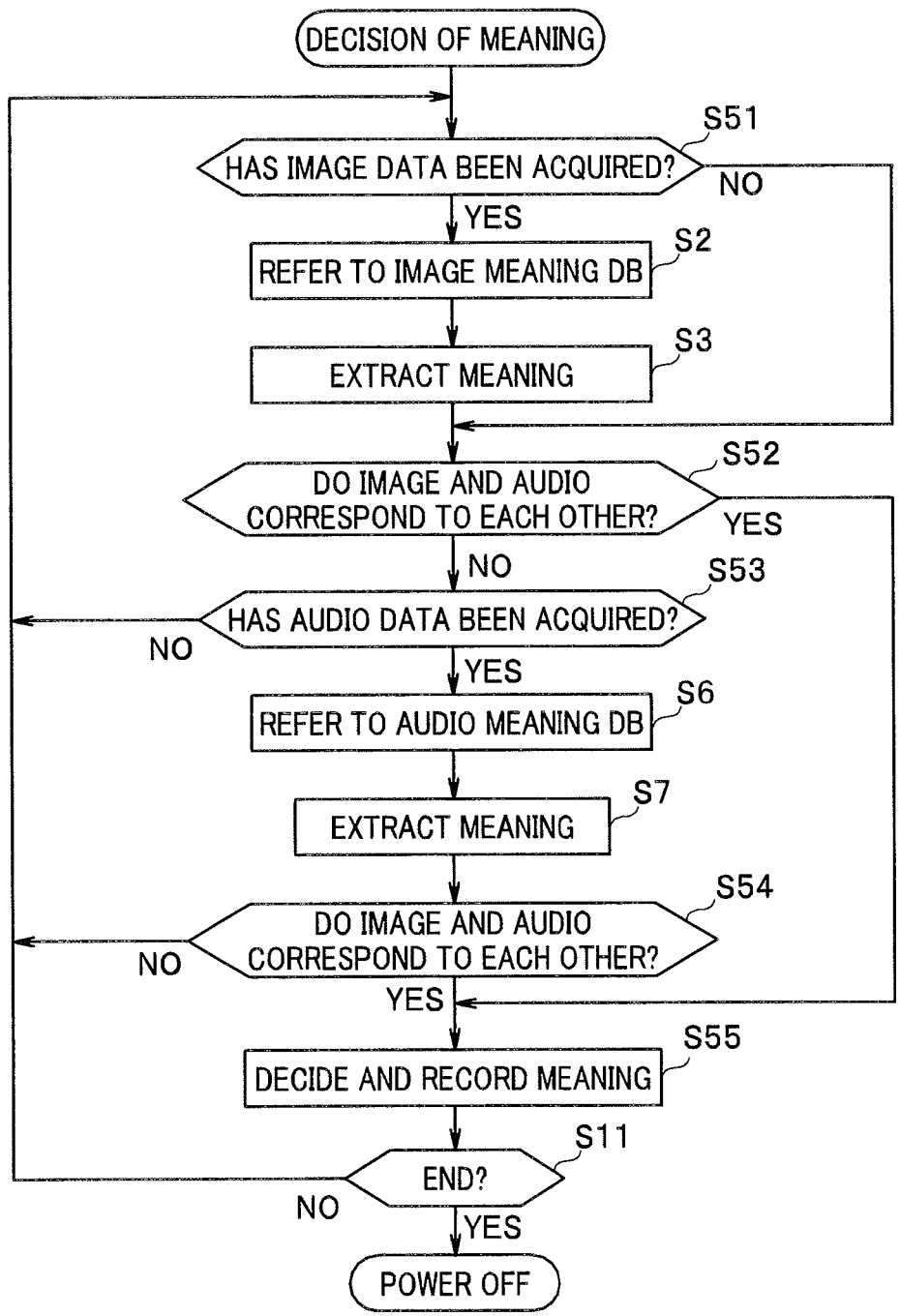
FIG. 14 is a flowchart showing a third embodiment of the present invention.

FIG. 14 is a flowchart showing a third embodiment of the present invention. In FIG. 14, same procedure steps as in FIG. 4 are given same reference numerals, and description thereof will be omitted. A hardware configuration of the present embodiment is similar to that of the first embodiment and is different from that of the first embodiment in that a meaning decision process is performed by the image-audio association control section 11.

In the present embodiment also, the image-audio association control section 11 acquires an inputted image (step S51) and compares characteristics of the inputted image with the characteristics of the images written in the image meaning DB 14 and extracts a meaning assigned to an image which can be judged to have corresponding characteristics. Furthermore, the image-audio association control section 11 acquires an inputted audio (step S53) and compares characteristics of the inputted audio with the characteristics of the audios written in the audio meaning DB 15 and extracts a meaning assigned to an audio which can be judged to have corresponding characteristics.

In the present embodiment, it is judged whether the meaning of the image and the meaning of the audio which have been judged by the image-audio association control section 11 correspond to each other or not, at steps S52 and S54. If it is judged at any of these steps S52 and S54 that the meanings of the image and the audio correspond to each other, the image-audio association control section 11 performs recording on the assumption that the meanings of the picked-up image and the acquired audio have been decided (step S55).

Thus, in the present embodiment, meanings of an image and an audio are judged, and, if the judged meanings of the image and the audio correspond to each other, the meanings of the image and the audio are decided. For example, if the present embodiment is applied to a shooting apparatus, it is possible to judge, for an image being picked up and an audio being acquired, whether the image and audio having the same meaning are being acquired or not. For example, in the case of attempting to shoot a river, it may happen that the river is displaced outside a field of view because of a way of holding up the shooting apparatus 20, or that a sound of the river cannot be certainly acquired because it is too noisy around the river. Even in such a case, it is possible to certainly identify an object by an image and an audio. It is also possible to enable a photographer to recognize whether an object has been certainly shot or not by showing that the object has been certainly identified, and it is also possible to perform recording at a time point when a shooting state is obtained in which an image and an audio have a same meaning.

Fourth Embodiment

Figure 15:
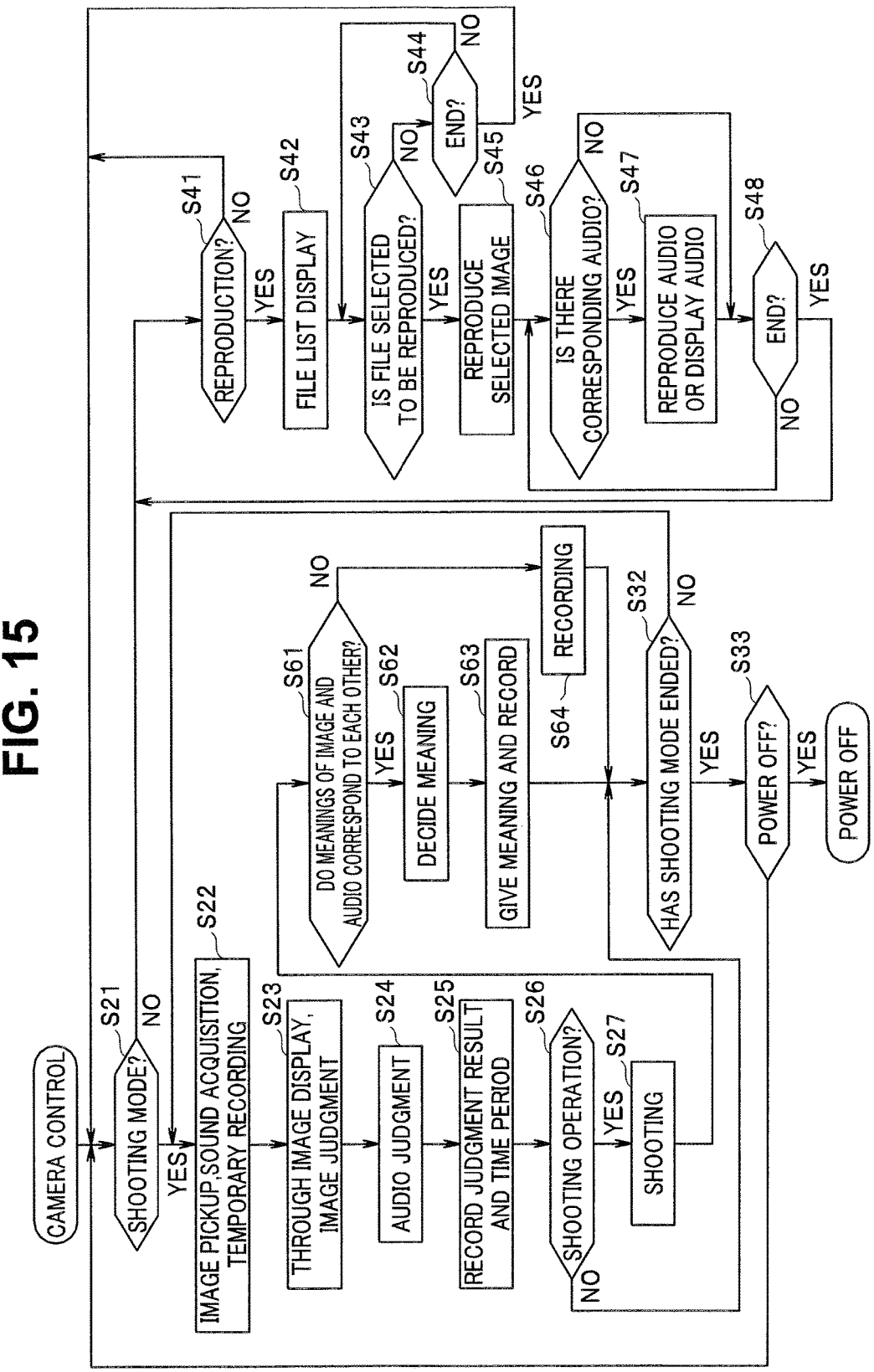
FIG. 15 is a flowchart showing a fourth embodiment of the present invention.

FIG. 15 is a flowchart showing a fourth embodiment of the present invention. In FIG. 15, same procedure steps as in FIG. 6 are given same reference numerals, and description thereof will be omitted. A hardware configuration of the present embodiment is similar to that of the second embodiment and is different from that of the second embodiment in that the meaning decision process is performed by the signal processing and control section 21.

In the present embodiment also, the target object judgment section 21c of the signal processing and control section 21 compares characteristics of a picked-up image recorded in the temporary recording section 25 with characteristics of images written in the DB 26 and extracts a meaning assigned to an image which can be judged to have corresponding characteristics. The target object judgment section 21c compares characteristics of an audio recorded in the temporary recording section 25 with characteristics of audios written in the DB 26 and extracts a meaning assigned to an audio which can be judged to have corresponding characteristics. The target object judgment section 21c records a judgment result and an image pickup time period or a sound acquisition time period to the temporary recording section 25.

The present embodiment is different from the second embodiment in that steps S61 to S64 are adopted instead of steps S29 to S31 in FIG. 6. When shooting is started, the signal processing and control section 21 judges whether an image meaning and an audio meaning which have been judged during a same judgment time period correspond to each other or not at step S61. Note that it is assumed that delay in the judgment by the target object judgment section 21c is ignored, and that the image pickup time period and the sound acquisition time period are indicated by the judgment time period.

If the image meaning and the audio meaning which have been judged during the same judgment time period do not correspond to each other, the signal processing and control section 21 immediately records the image being picked up and the audio being acquired, at step S64. If the image meaning and the audio meaning which have been judged during the same judgment time period correspond to each other, the signal processing and control section 21 decides that the meanings of the image being picked up and the audio being acquired have the judged meaning and performs recording, adding information showing the meanings. For example, the signal processing and control section 21 may perform the recording, including display showing the meaning in the image or may record text indicating the meaning together with an image file.

Figure 16:
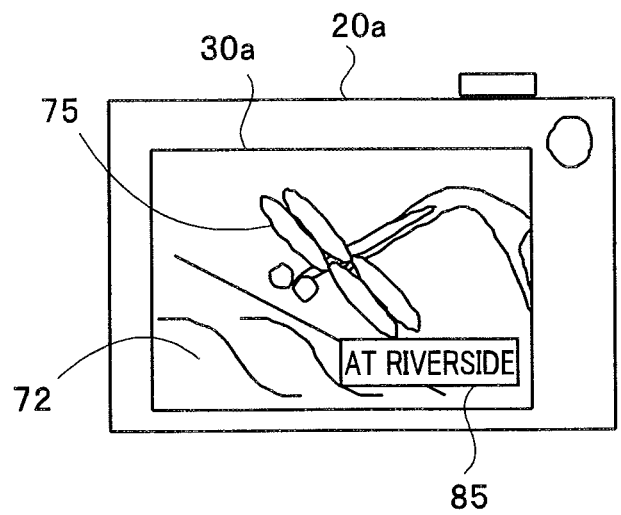
FIG. 16 is an explanatory diagram showing a display example in a case where display showing a meaning is included in an image.

FIG. 16 is an explanatory diagram showing a display example in the case where display showing a meaning is included in an image. An example is shown in which a display 85 showing "At riverside" is displayed on the basis of judgment of an image of a river and an audio of a sound of a river in the shooting scene in FIG. 10C.

Thus, in the present embodiment also, meanings of an image and an audio are judged, and, if the judged meanings of the image and the audio correspond to each other, the meanings of the image being picked up and the audio being acquired are decided, and display and recording can be performed. For example, in the case of attempting to shoot a river, it may happen that the river is displaced outside a field of view because of a way of holding up the shooting apparatus 20, or that a sound of the river cannot be certainly acquired because it is too noisy around the river. Even in such a case, it is possible to detect that a photographer is conscious of performing shooting at a riverside by an image and an audio acquired during a through image display period (specific judgment of a particular object may be performed during the through image display period) and include a display or the like showing that into an image, so that the photographer's intention of shooting can be shown.

In the case of an image, a meaning is judged by a shade and shadow pattern on a screen (direction, shape, color and the like) and temporal change in the pattern (including a direction, regularity and frequency of the change). In the case of an audio also, a meaning is judged by a frequency and temporary change (including regularity) and the like of the detected audio. It is natural to think that an image in which a color, shape or brightness drastically changes corresponds to a large pulse-shaped audio more than a quiet continuous sound. An image which regularly changes is suitable for an audio in which a regular audio pattern is reproduced together. It is preferable that such an image and audio to be paired are given a same meaning. A low sound (with a low frequency) is suitable for a big image change, and a high sound (with a high frequency) is suitable for a small image change. Of course, if enlarged shooting is performed, such unnaturalness occurs that a bird actually making high notes makes low notes. Therefore, an angle of view and a distance at the time of shooting may be taken into account to make a judgment. In this example, a specific judgment (bubbles or a river flow) of a particular object is taken into account so that natural reproduction is performed, with scenes often shot as representative examples.

In each of the above embodiments, description has been made on an information processing device provided with: an image meaning judgment section judging a meaning of an inputted image by classifying characteristics of the image itself and referring to a database; an audio meaning judgment section judging a meaning of an inputted audio by classifying characteristics of the audio itself and referring to a database; and an association control section outputting the inputted image and the inputted audio mutually in association with each other on the basis of each of judgment results of the image meaning judgment section and the audio meaning judgment section. In the case of mounting on a product or a service, metadata such as time information and position information may be appropriately used.

Furthermore, description has been made with the use of a digital camera as an apparatus for shooting in each of the embodiments of the present invention. As a camera, however, either a digital single-lens reflex camera or a compact digital camera is also possible; a camera for movie such as a video camera and a movie camera is also possible; and, furthermore, a camera included in a personal digital assistant (PDA) and the like, such as a mobile phone and a smartphone, is also possible, of course. Furthermore, an industrial or medical optical apparatus, such as an endoscope and a microscope, is also possible. A monitoring camera, an onboard camera or a fixed camera, for example, a camera attached to a television receiver, a personal computer or the like is also possible. For example, by associating an audio pattern and a picked-up image pattern with each other, it becomes possible to judge what is displayed by an audio without watching a screen. This makes it possible to perform a blind operation, and user-friendly specifications are obtained. There may be a case where, if a change is small, a user cannot visually notice the change though he is watching a screen. However, by overlapping audio information, it is possible to call the user's attention.

The present invention is not immediately limited to each of the above embodiments. At a stage of practicing each embodiment, the components can be transformed and embodied within a range not departing from the spirit of the invention. By appropriately combining multiple components disclosed in each of the above embodiments, various inventions can be formed. For example, some of all the components shown in the embodiment may be deleted. Furthermore, components of different embodiments may be appropriately combined.

Even if description is made with "First," "Next," and the like for convenience with regard to an operation flow in WHAT IS CLAIMED IS, Specification and the drawings, it does not mean that it is indispensable to execute the operation flow in that order. It goes without saying that each of steps constituting the operation flow can be appropriately omitted if the step is a part which does not influence the substance of the invention.

Among the techniques described here, many of the controls and functions described mainly in the flowcharts can be set by a program. By a computer reading and executing the program, the above-stated controls and functions can be realized. All or a part of the program can be recorded or stored in a portable medium such as a nonvolatile memory such as a flexible disk and a CD-ROM, or a storage medium, such as a hard disk and a volatile memory, as a computer program product, and can be distributed or provided at the time of shipment of the product or via a portable medium or a communication line. A user can easily realize the information processing device, shooting apparatus and information processing method of the present embodiments by downloading the program via the communication network and installing the program in a computer or by installing the program from a recording medium.

What is claimed is:

1. An information processing device comprising:
   an image meaning judgment section classifying and judging an inputted image, acquired without a corresponding audio, as having a particular meaning by classifying characteristics of the image and referring to an image database;
   an audio meaning judgment section classifying and judging an inputted audio, acquired independently from the inputted image and without a corresponding image, as having a particular meaning by classifying characteristics of the audio and referring to an audio database independent of the image database; and
   an association control section that:
   associates an audio related to the inputted image, acquired at a different time than the inputted image, based on the judgment result of the image meaning judgment section, and outputs the inputted image with the related audio mutually in association with each other; and
   associates an image related to the inputted audio, acquired at a different time than the inputted audio, based on the judgment result of the audio meaning judgment section, and outputs the inputted audio with the related image mutually in association with each other.

2. The information processing device according to claim 1, wherein
   the characteristics of the image used by the image meaning judgment section are detected color, shade and shadow patterns on a screen or temporal change in the patterns; and
   the characteristics of the audio used by the audio meaning judgment section are frequency or temporal change in the detected audio.

3. The information processing device according to claim 2, comprising:
   a correspondence judgment section judging correspondence between the judgment result of the image meaning judgment section and the judgment result of the audio meaning judgment section; and
   a meaning decision section deciding the meanings of the inputted image and the inputted audio on the basis of a correspondence judgment from the correspondence judgment section.

4. The information processing device according to claim 1, wherein the databases are created by classifying images stored in a cloud and languages accompanying the images.

5. The information processing device according to claim 4, comprising:
   a correspondence judgment section judging correspondence between the judgment result of the image meaning judgment section and the judgment result of the audio meaning judgment section; and
   a meaning decision section deciding the meanings of the inputted image and the inputted audio on the basis of a correspondence judgment from the correspondence judgment section.

6. The information processing device according to claim 1, comprising:
   a correspondence judgment section judging correspondence between the judgment result of the image meaning judgment section and the judgment result of the audio meaning judgment section; and
   a meaning decision section deciding the meanings of the inputted image and the inputted audio on the basis of a correspondence judgment from the correspondence judgment section.

7. The information processing device according to claim 1, wherein
   the inputted image is an image obtained by performing shooting in water; and
   the inputted audio is an audio that occurs in water.

8. A shooting apparatus comprising:
   an image pickup section picking up an image of an object to obtain a picked-up image;
   a sound acquisition section acquiring a sound to obtain a picked-up audio independent from the picked-up image and which does not correspond to the picked-up image;
   a temporary recording section recording the picked-up image and the picked-up audio;
   an image meaning judgment section judging a meaning of the picked-up image as having a particular meaning by referring to an image database and recording a judgment result;
   an audio meaning judgment section judging a meaning of the picked-up audio as having a particular meaning by referring to an audio database independent of the image database, and recording a judgment result; and
   a selection section reading out an audio corresponding to the picked-up image from the audio database on the basis of the judgment result of the image meaning judgment section, the corresponding audio being acquired at a different time than the picked-up image, and outputting the corresponding audio in association with the picked-up image, or reading out a an image corresponding to the picked-up audio from the image database on the basis of the judgment result of the audio meaning judgment section, the corresponding image being acquired at a different time than the picked-up audio, and outputting the corresponding image in association with the picked-up audio.

9. The shooting apparatus according to claim 8, comprising:
a correspondence judgment section judging correspondence between the judgment result of the image meaning judgment section and the judgment result of the audio meaning judgment section; and
a meaning decision section deciding the meanings of the picked-up image and the picked-up audio on the basis of a correspondence judgment from the correspondence judgment section.

10. The shooting apparatus according to claim 8, wherein
the image meaning judgment section records the judgment result of the meaning of the picked-up image and information about an image pickup time period of the picked-up image for which the meaning is judged;
the audio meaning judgment section records the judgment result of the meaning of the picked-up audio and information about a sound acquisition time period of the picked-up audio for which the meaning is judged; and
the selection section outputs the corresponding audio associated with the picked-up image or outputs the corresponding image associated with the picked-up audio on the basis of the information about the image pickup time period and the sound acquisition time period.

11. The shooting apparatus according to claim 8, wherein
the picked-up image is an image obtained by performing shooting in water; and
the picked-up audio is an audio that occurs in water.

12. An information processing method comprising:
an image meaning judgment section classifying and judging an inputted image as having a particular meaning by classifying characteristics of the image, including at least one of color, shade and shadow patterns on a screen and temporal change in the patterns, and referring to an image database;
an audio meaning judgment section classifying and judging an inputted audio, acquired independently from the inputted image and which does not correspond to the inputted image, as having a particular meaning by classifying characteristics of the audio, including at least one of frequency and temporal change in the detected audio, and referring to an audio database independent of the image database; and
an association control section that:
associates an audio related to the inputted image, acquired at a different time than the inputted image, based on the judgment result of the image meaning judgment section, and outputs the inputted image with the related audio mutually in association with each other; and
associates an image related to the inputted audio, acquired at a different time than the inputted audio, based on the judgment result of the audio meaning judgment section, and outputs the inputted audio with the related image mutually in association with each other.

* * * * *